(12) United States Patent
Liu

(10) Patent No.: US 9,634,872 B2
(45) Date of Patent: Apr. 25, 2017

(54) MULTIMODE RECEIVER AND RECEIVING METHOD THEREFOR

(71) Applicant: ZTE Corporation, Shenzhen, Guangdong (CN)

(72) Inventor: Haiguang Liu, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/439,602

(22) PCT Filed: Aug. 14, 2013

(86) PCT No.: PCT/CN2013/081485
§ 371 (c)(1),
(2) Date: May 19, 2015

(87) PCT Pub. No.: WO2014/067315
PCT Pub. Date: May 8, 2014

(65) Prior Publication Data
US 2015/0295739 A1    Oct. 15, 2015

(30) Foreign Application Priority Data

Nov. 5, 2012 (CN) .......................... 2012 1 0436094

(51) Int. Cl.
H04L 27/06    (2006.01)
H04L 27/14    (2006.01)
(Continued)

(52) U.S. Cl.
CPC ............. *H04L 27/14* (2013.01); *H04B 1/006* (2013.01); *H04B 1/18* (2013.01); *H04B 1/401* (2013.01); *H04L 25/02* (2013.01); *H04W 88/06* (2013.01)

(58) Field of Classification Search
CPC . H04L 25/067; H04L 1/0045; H04L 27/2647; H04L 1/005; H04L 1/0054;
(Continued)

(56) References Cited

U.S. PATENT DOCUMENTS 6,175,746 B1    1/2001  Nakayama
6,459,905 B1   10/2002  Fuji
(Continued)

FOREIGN PATENT DOCUMENTS

CN    1337840 A     2/2002
CN    1549644 A    11/2004
(Continued)

OTHER PUBLICATIONS

International Search Report in international application No. PCT/CN2013/081485, mailed on Nov. 21, 2013.
(Continued)

*Primary Examiner* — Zewdu Kassa
(74) *Attorney, Agent, or Firm* — Oppedahl Patent Law Firm LLC

(57) ABSTRACT

Disclosed is a multimode receiver, comprising: an antenna system configured to receive a signal sent by a base station and select a receiving circuit front end according to the frequency band of the signal; more than one receiving circuit front end configured to perform down-conversion frequency processing on a signal sent by the antenna system and send the processed signal to an I/Q demodulator; the I/Q demodulator configured to demodulate the signal sent by the receiving circuit front ends and send the demodulated signal to a baseband unit; and the baseband unit configured to decode the demodulated signal. Disclosed is a receiving method for a multimode receiver. By adopting the present invention, one set of receiving circuit front ends can be utilized for signals of the same frequency band and different modes,
(Continued)

decreasing the number of radio-frequency chips, and lowering the cost.

5 Claims, 1 Drawing Sheet

(51) Int. Cl.
*H04B 1/18* (2006.01)
*H04B 1/401* (2015.01)
*H04B 1/00* (2006.01)
*H04L 25/02* (2006.01)
*H04W 88/06* (2009.01)

(58) Field of Classification Search
CPC .......... H04L 1/20; H04N 5/4401; H04B 1/30; H04B 1/28
USPC .................. 375/340, 316, 295, 219
See application file for complete search history.

(56) References Cited

U.S. PATENT DOCUMENTS

| | | | |
|---|---|---|---|
| 6,708,044 B1* | 3/2004 | Puknat ................... | H04B 1/005 455/550.1 |
| 2003/0193923 A1* | 10/2003 | Abdelgany ............ | H04B 1/005 370/342 |
| 2004/0120421 A1 | 6/2004 | Filipovic | |
| 2004/0240476 A1* | 12/2004 | Joshi .................. | H04B 1/70753 370/500 |
| 2006/0052131 A1 | 3/2006 | Ichihara | |
| 2006/0121937 A1 | 6/2006 | Son | |
| 2007/0243832 A1 | 10/2007 | Park | |
| 2008/0166984 A1 | 7/2008 | Shie | |
| 2009/0082017 A1 | 3/2009 | Chang | |
| 2010/0105425 A1 | 4/2010 | Asokan | |
| 2010/0309825 A1* | 12/2010 | Zhang ................... | H04B 1/006 370/278 |
| 2012/0202561 A1 | 8/2012 | Robinett | |
| 2014/0269853 A1* | 9/2014 | Gudem ................. | H04L 5/0098 375/219 |

FOREIGN PATENT DOCUMENTS

| | | |
|---|---|---|
| CN | 1787390 A | 6/2006 |
| CN | 1795616 A | 6/2006 |
| CN | 101510788 A | 8/2009 |
| CN | 102098071 A | 6/2011 |
| CN | 102404882 A | 4/2012 |
| CN | 102621478 A | 8/2012 |
| CN | 102946257 A | 2/2013 |
| EP | 0996241 A1 | 4/2000 |
| EP | 1633055 A2 | 3/2006 |
| GB | 2312108 A | 10/1997 |
| JP | 2001186042 A | 7/2001 |
| JP | 2005142892 A | 6/2005 |
| JP | 2007529181 A | 10/2007 |
| WO | 2006126166 A2 | 11/2006 |
| WO | 2009039435 A1 | 3/2009 |

OTHER PUBLICATIONS

English Translation of the Written Opinion of the International Search Authority in international application No. PCT/CN2013/081485, mailed on Nov. 21, 2013.

Supplementary European Search Report in European application No. 13851878.2, mailed on Oct. 21, 2015.

* cited by examiner

MULTIMODE RECEIVER AND RECEIVING METHOD THEREFOR

TECHNICAL FIELD

The disclosure relates to the field of multi-mode receiving, in particular to a multi-mode receiver and receiving method thereof.

BACKGROUND

With rapid development of circuit integration, Radio Frequency RF circuits tend to be integrated and modular, which is particularly beneficial to mobile User Equipment UE miniaturization. An RF circuit of an existing mobile UE (such as a cellphone) consists of an RF integrated circuit as a core and of peripheral auxiliary and control circuits. The RF integrated circuit, as the main part of the mobile UE RF circuit, may include a signal receiving circuit and a signal transmitting circuit. The signal receiving circuit may include an antenna, a Surface Acoustic Wave SAW filter, a Low Noise Amplifier LNA, a mixer, an Intermediate-Frequency IF filter, an IF amplifier, etc.

When a mobile UE receives a signal, the signal sent out by a base station BS managing a cell, such as a Global System of Mobile communication GSM 900 MHz signal, is transmitted to an antenna end of the mobile UE via a wireless interface. The signal may enter the SAW through the antenna, where any out-of-band signal and noise may be filtered out. The filtered signal may enter the LNA to be amplified. The LNA-amplified signal may be sent to the mixer, where the LNA-amplified signal may be mixed with a Local Oscillator LO signal output by a Voltage Controlled Oscillator VCO, producing an IF signal. The IF signal is sent through the IF filter, such that any out-of-band noise may be filtered out. Then, the filtered IF signal may be sent to the IF amplifier, where the filtered IF signal may be amplified. Then, the output signal may enter an In-phase/Quadrature I/Q demodulator, where the output signal is demodulated. The demodulated I/Q signal may be sent to a baseband part, where digital processing is performed on the demodulated I/Q signal.

In an existing mobile UE, in order to allow a receiver thereof to receive signals in different frequency bands, such as GSM 900 MHz and GSM 1800 MHz, a receiving circuit is designed respectively for receiving signals in each frequency band. Such parallel receiving circuits are then integrated into one overall integrated circuit. In addition, an antenna switch is added at a rear end of an antenna, to transfer a received signal respectively to a receiving circuit corresponding to a frequency band of the received signal. On this basis, in order to allow the receiver of a mobile UE to receive signals in different modes, such as signals in GSM 800 MHz/1900 MHz and in Time Division-Synchronous Code Division Multiple Access TD-SCDMA 1880 MHz-1920 MHz, a receiving circuit may further be designed respectively for receiving signals in each mode.

As an RF circuit adopts Time Division Multiplexing, receiving and transmitting will not be performed at the same time, front ends of receiving circuits for receiving same-band signals in different modes are completely equivalent. Therefore, for same-band signals in different modes, receiving circuit front ends inside the integrated circuit may be used repeatedly, which may lead to multiple equivalent RF chips in the integrated circuit, increasing an area and cost in circuit design.

SUMMARY

In view of this, embodiments herein provide a multi-mode receiver and receiving method thereof, capable of simplifying a receiving circuit front end of a mobile UE, thereby lowering a number of chips, reducing an area and cost in circuit design.

To this end, a technical solution according to an embodiment herein may be implemented as follows.

According to an embodiment herein, a multi-mode receiver may include an antenna system, one or more receiving circuit front ends, an In-phase/Quadrature I/Q demodulator, and a baseband unit.

The antenna system may be configured for: receiving a signal sent by a base station BS, sending the signal sent by the BS to a receiving circuit front end of the one or more receiving circuit front ends that corresponds to a frequency band of the signal sent by the BS.

Each of the one or more receiving circuit front ends may be configured for: receiving a signal sent by the antenna system, performing down-conversion on the signal sent by the antenna system, and sending the down-converted signal to the I/Q demodulator.

The I/Q demodulator may be configured for: receiving a signal sent by one of the one or more receiving circuit front ends, demodulating the signal sent by one of the one or more receiving circuit front ends, and sending the demodulated signal to the baseband unit.

The baseband unit may be configured for: decoding the demodulated signal.

The multi-mode receiver may further include a protocol detecting device.

The antenna system may be further configured for: sending the signal sent by the BS to the protocol detecting device.

The protocol detecting device may be configured for: receiving a signal sent by the antenna system, detecting the signal sent by the antenna system, and selecting a transmission mode and a decoding mode for the demodulated signal according to synchronization information of the signal sending BS side.

The I/Q demodulator may be configured for: sending the demodulated signal to the baseband unit according to the transmission mode selected by the protocol detecting device.

The baseband unit may be configured for: decoding the demodulated signal in the decoding mode selected by the protocol detecting device.

The antenna system may include an antenna and an antenna switch.

The antenna may be configured for: receiving the signal sent by the BS, and transferring the signal sent by the BS to the antenna switch.

The antenna switch may be configured for: receiving a signal transferred by the antenna, sending the signal transferred by the antenna to the receiving circuit front end corresponding to the frequency band of the signal transferred by the antenna, and sending the signal sent by the BS to the protocol detecting device which then detects the received signal.

The one or more receiving circuit front ends may include a first receiving circuit front end, a second receiving circuit front end, and a third receiving circuit front end.

The first receiving circuit front end may be configured for: receiving a first signal in a first frequency band sent by the antenna system, performing down-conversion on the first signal, sending the down-converted first signal to the I/Q demodulator.

The second receiving circuit front end may be configured for: receiving a second signal in a second frequency band sent by the antenna system, performing down-conversion on the second signal, sending the down-converted second signal to the I/Q demodulator.

The third receiving circuit front end may be configured for: receiving a third signal in a third frequency band sent by the antenna system, performing down-conversion on the third signal, sending the down-converted third signal to the I/Q demodulator.

Each of the first signal, the second signal, and the third signal may include a group of same-band signals in different modes. The first frequency band, the second frequency band, and the third frequency band may differ from each other.

A receiving method for a multi-mode receiver may include:

receiving a signal sent by a base station BS; performing frequency conversion on the signal using a receiving circuit front end corresponding to a frequency band of the signal; and performing I/Q demodulation on the frequency-converted signal, and decoding the demodulated signal.

The frequency conversion may include filtering, amplification, down-conversion, Intermediate-Frequency IF filtering, and IF amplification.

The method may further include: detecting the signal sent by the BS.

The detecting the signal sent by the BS may include: selecting a transmission mode and a decoding mode for a demodulated I/Q signal according to synchronization information of the signal sending BS side.

The decoding the demodulated signal may include: decoding the demodulated signal in the selected decoding mode.

The selecting a transmission mode and a decoding mode for a demodulated I/Q signal may include:

automatically matching a Global System of Mobile communication GSM signal with a transmission mode of a Digital Radio Frequency DigRF interface protocol; automatically matching a Time Division-Synchronous Code Division Multiple Access TD-SCDMA signal with a 10-bit parallel-port data transmission mode; and automatically matching a Time Division Long Term Evolution TD-LTE signal with a 12-bit parallel-port data transmission mode; and decoding each of the GSM signal, the TD-SCDMA signal, and the TD-LTE signal using a data processing unit corresponding to the each of the GSM signal, the TD-SCDMA signal, and the TD-LTE signal.

With a multi-mode receiver and receiving method thereof according to an embodiment herein, an antenna switch may be built inside the multi-mode receiver, such that a receiving circuit front end corresponding to a frequency band of a received signal may be selected; a protocol detecting device may be built inside the multi-mode receiver, such that modes of same-band signals may be detected; thereby a transmission mode for transmitting the demodulated I/Q signal and a decoding unit for decoding the I/Q signal transmitted to the baseband may be provided. Therefore, same-band signals in different modes may share one receiving circuit front end, reducing a number of RF chips used and lowering an area and cost in circuit design.

DETAILED DESCRIPTION

For understanding more details of features and technical content according to an embodiment herein, an embodiment herein is elaborated below with reference to drawings. The drawings are only for reference and illustration, and are not for limiting an embodiment herein.

Figure 1:
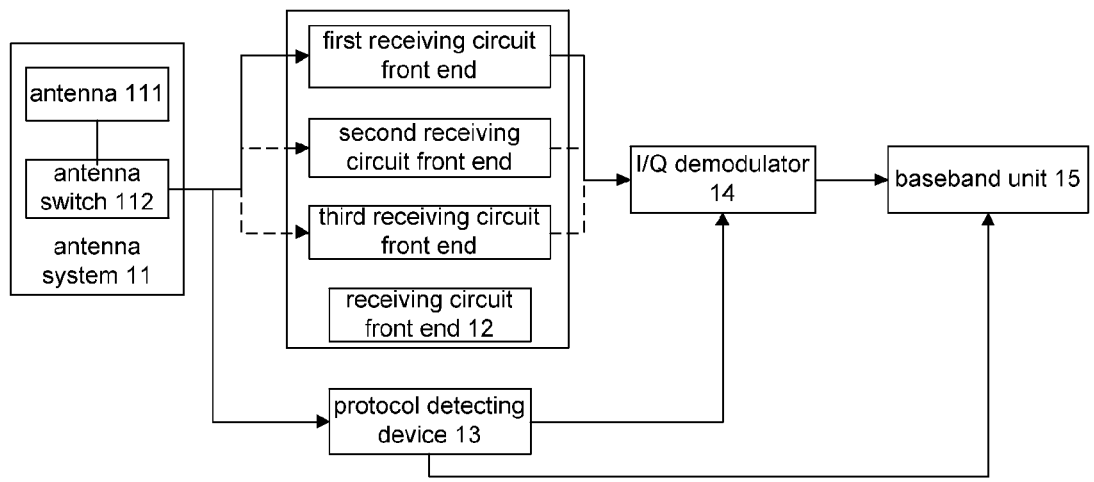
FIG. 1 is a schematic diagram of a structure of a multi-mode receiver according to an embodiment herein.

FIG. 1 is a schematic diagram of a structure of a multi-mode receiver according to an embodiment herein. As shown in FIG. 1, the multi-mode receiver may include an antenna system 11, one or more receiving circuit front ends 12, an I/Q demodulator 14, and a baseband unit 15.

The antenna system 11 may be configured for: receiving a signal sent by a BS, and sending the signal sent by the BS to one of the one or more receiving circuit front ends 12 that corresponds to a frequency band of the signal sent by the BS.

The signal sent by the BS may be signals in different modes, such as a GSM signal, a TD-SCDMA signal, a TD-LTE signal, etc.

Signals in a mode may include signals in different frequency bands. For example, GSM signals may include signals of: GSM 850 MHz/900 MHz, GSM 1800 MHz/1900 MHz, etc. TD-SCDMA signals may include signals of: TD-SCDMA 1880 MHz-1920 MHz, TD-SCDMA 2300 MHz-2400 MHz, etc. TD-LTE signals may include signals of: TD-LTE 1880 MHz-1920 MHz, TD-LTE 2300 MHz-2400 MHz, etc.

Signals in the same frequency band or in bands close to each other may be sent to one receiving circuit front end 12. For example, signals of GSM 1800 MHz/1900 MHz, TD-SCDMA 1880 MHz-1920 MHz, TD-LTE 1880 MHz-1920 MHz may be sent to one receiving circuit front end 12; signals of TD-SCDMA 2300 MHz-2400 MHz and TD-LTE 2300 MHz-2400 MHz may be sent to one receiving circuit front end 12; signals of GSM 850 MHz/900 MHz may be sent to one receiving circuit front end 12.

A receiving circuit front end 12 may be configured for: receiving a signal sent by the antenna system 11, performing down-conversion on the signal sent by the antenna system, and sending the down-converted signal to the I/Q demodulator 14, where I/Q demodulation may be performed.

The frequency conversion may include filtering, amplification, down-conversion, IF filtering, and IF amplification. By the filtering, an out-of-band signal may be filtered out. By the amplification, the filtered signal may be amplified. By the down-conversion, the amplified signal may be mixed into an IF signal. By the IF filtering, an out-of-band signal in the IF signal may be filtered out. By the IF amplification, the filtered IF signal may be amplified.

The I/Q demodulator 14 may be configured for: receiving a down-converted signal sent by a receiving circuit front end 12, performing I/Q demodulation on the received signal, and sending a demodulated I/Q signal to the baseband unit 15.

The baseband unit 15 may be configured for decoding the I/Q signal sent by the I/Q demodulator 14.

The multi-mode receiver may further include a protocol detecting device 13. The protocol detecting device may be configured for: receiving the signal sent by the BS via the antenna system 11, detecting the signal, and selecting a transmission mode and a decoding mode for the demodulated I/Q signal according to synchronization information of the signal sending BS side.

The synchronization information of the BS side may include a pilot signal, a modulation mode, a downlink synchronization code, etc.

A transmission mode may be selected for the demodulated I/Q signal as follows. When the synchronization information such as a Gaussian Filtered Minimum Shift Keying GMSK modulation mode shows that the signal sent by the BS is a GSM signal, the I/Q demodulator 14 may be automatically matched with a transmission mode of a Digital Radio Frequency DigRF interface protocol; the demodulated I/Q signal may then be transmitted to the baseband unit 15. When the synchronization information such as a downlink synchronization code shows that the signal sent by the BS is a TD-SCDMA signal, the I/Q demodulator 14 may be automatically matched with a 10-bit parallel-port data transmission mode; the demodulated I/Q signal may then be transmitted to the baseband unit 15. When the synchronization information such as a downlink synchronization code shows that the signal sent by the BS is a TD-LTE signal, the I/Q demodulator 14 may be automatically matched with a 12-bit parallel-port data transmission mode; the demodulated I/Q signal may then be transmitted to the baseband unit 15.

A decoding mode may be selected for the demodulated I/Q signal as follows. The signal may be decoded using a data processing unit (such as a Reduced Instruction Set Computer RISC processor or a Digital Signal Processing DSP unit) in the baseband unit 15 corresponding to the mode of the signal.

The antenna system may further be configured for: sending the signal sent by the BS to the protocol detecting device.

The I/Q demodulator may be configured for sending the demodulated signal to the baseband unit according to the transmission mode selected by the protocol detecting device. The transmission mode may be a transmission mode of a DigRF interface protocol automatically matched with a GSM signal. The transmission mode may be a 10-bit parallel-port data transmission mode automatically matched with a TD-SCDMA signal. The transmission mode may be a 12-bit parallel-port data transmission mode automatically matched with a TD-LTE signal.

The baseband unit may be configured for: decoding the demodulated signal in the decoding mode selected by the protocol detecting device. The decoding may be performed using a data processing unit in the baseband unit 15 (such as a RISC processor or a DSP) corresponding to the mode of the signal.

The antenna system 11 may include an antenna 111 and an antenna switch 112.

The antenna 111 may be configured for: receiving the signal sent by the BS, and transferring the signal to the antenna switch 112. The signal may be sent to a receiving circuit front end 12 corresponding to the frequency band of the signal.

The signal sent by the BS may be signals in different modes, such as a GSM signal, a TD-SCDMA signal, and a TD-LTE signal, etc.

Signals in a mode may include signals in different frequency bands. For example, GSM signals may include signals of: GSM 850 MHz/900 MHz, GSM 1800 MHz/1900 MHz, etc. TD-SCDMA signals may include signals of: TD-SCDMA 1880 MHz-1920 MHz, TD-SCDMA 2300 MHz-2400 MHz, etc. TD-LTE signals may include signals of: TD-LTE 1880 MHz-1920 MHz, TD-LTE 2300 MHz-2400 MHz, etc.

The antenna switch 112 may be configured for: receiving the signal sent by the antenna 111, sending the signal to the receiving circuit front end 12 corresponding to the frequency band of the signal, and sending the signal sent by the BS to the protocol detecting device 13 which then detects the received signal.

Signals in the same frequency band or in bands close to each other may be sent to one receiving circuit front end 12. For example, signals of GSM 1800 MHz/1900 MHz, TD-SCDMA 1880 MHz-1920 MHz, TD-LTE 1880 MHz-1920 MHz may be sent to one receiving circuit front end 12; signals of TD-SCDMA 2300 MHz-2400 MHz and TD-LTE 2300 MHz-2400 MHz may be sent to one receiving circuit front end 12; signals of GSM 850 MHz/900 MHz may be sent to one receiving circuit front end 12.

The receiving circuit front end 12 may include a first receiving circuit front end, a second receiving circuit front end, and a third receiving circuit front end.

The first receiving circuit front end may be configured for: receiving a first signal in a first frequency band sent by the antenna switch 111 in the antenna system 11, performing down-conversion on the first signal, and sending the down-converted first signal to the I/Q demodulator 14, where I/Q demodulation may be performed.

The first signal in the first frequency band may include signals in the same frequency band or in bands close to each other, such as signals in GSM 1800 MHz/1900 MHz, TD-SCDMA 1880 MHz-1920 MHz, TD-LTE 1880 MHz-1920 MHz.

The second receiving circuit front end may be configured for: receiving a second signal in a second frequency band sent by the antenna switch 111 in the antenna system 11, performing down-conversion on the second signal, and sending the down-converted second signal to the I/Q demodulator 14, where I/Q demodulation may be performed.

The second signal in the second frequency band may include signals in the same frequency band or in bands close to each other, such as signals in TD-SCDMA 2300 MHz-2400 MHz and TD-LTE 2300 MHz-2400 MHz.

The third receiving circuit front end may be configured for: receiving a third signal in a third frequency band sent by the antenna switch 111 in the antenna system 11, performing down-conversion on the third signal, and sending the down-converted third signal to the I/Q demodulator 14, where I/Q demodulation may be performed.

The third signal in the third frequency band may include signals in the same frequency band or in bands close to each other, such as signals in GSM 850 MHz/900 MHz.

The frequency conversion may include filtering, amplification, down-conversion, IF filtering, and IF amplification. By the filtering, an out-of-band signal may be filtered out. By the amplification, the filtered signal may be amplified. By the down-conversion, the amplified signal may be mixed into an IF signal. By the IF filtering, an out-of-band signal in the IF signal may be filtered out. By the IF amplification, the filtered IF signal may be amplified.

The first receiving circuit front end may perform frequency conversion on a frequency band around 1800 MHz. The second receiving circuit front end may perform frequency conversion on a frequency band around 2300 MHz. The third receiving circuit front end may perform frequency conversion on a frequency band around 900 MHz.

Here, as an example only, assume that a frequency of a signal sent by a BS falls into three bands. In an actual application, when there are fewer or more frequency bands, more or less than 3 receiving circuit front ends may be used. For example, two receiving circuit front ends, four receiving circuit front ends, five receiving circuit front ends, or the like may be adopted to respectively process signals in different frequency bands. The processing and a mode thereof may be similar to what described.

In an actual application, the antenna 111 in the antenna system 11 may be implemented by an antenna apparatus. The antenna switch 112 in the antenna system 11 may be implemented by a switch logic circuit. The receiving circuit front end 12 may be implemented by a filter, an amplifier, a down-converter, an IF filter, and an IF amplifier. The baseband unit 15 may be implemented by a decoder in a baseband system. The protocol detecting device 13 may be implemented by a protocol detecting logic circuit.

Figure 2:
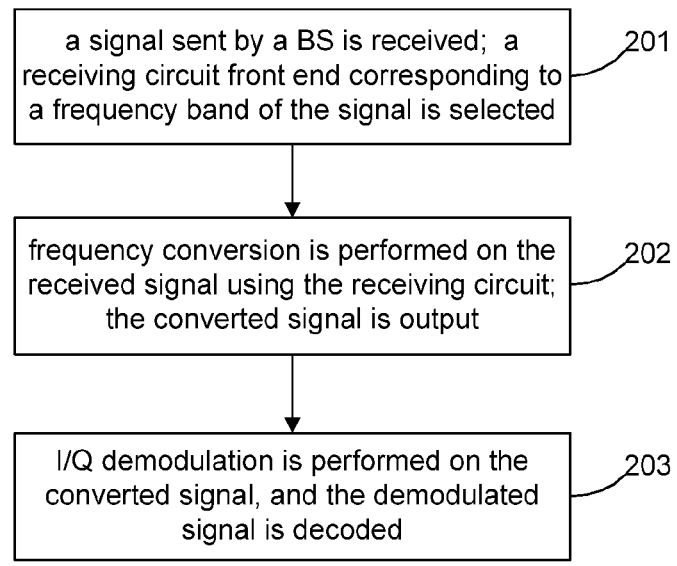
FIG. 2 is a flowchart of a receiving method for a multi-mode receiver according to an embodiment herein.

FIG. 2 is a flowchart of a receiving method for a multi-mode receiver according to an embodiment herein. As shown in FIG. 2, the method may include steps as follows.

In step 201, a signal sent by a BS is received; a receiving circuit front end corresponding to a frequency band of the signal is selected.

The signal sent by the BS may be received by the antenna system. A receiving circuit front end corresponding to the frequency band of the signal may be selected. The signal sent by the BS may be sent to the selected receiving circuit front end.

The signal sent by the BS may be a signal in any mode and any band, such as a signal in GSM 1800 MHz. A receiving circuit front end corresponding to the frequency band of a signal may be selected by selecting one receiving circuit front end for signals in the same frequency band or in bands close to each other. For example, for signals in GSM 1800 MHz, a receiving circuit front end corresponding to a frequency band around 1800 MHz, namely the first receiving circuit front end, may be selected.

In step 202, frequency conversion is performed on the received signal using the selected receiving circuit; the converted signal is output.

The frequency conversion may include filtering, amplification, down-conversion, IF filtering, and IF amplification. For example for a GSM signal in a 1800 MHz band, by the filtering, a signal outside the 1800 MHz band may be filtered out from the GSM signal. By the amplification, the filtered GSM signal may be amplified. By the down-conversion, the amplified GSM signal may be mixed into a GSM IF signal. By the IF filtering, an out-of-band signal in the GSM IF signal may be filtered out. By the IF amplification, the filtered GSM IF signal may be amplified.

In step 203, I/Q demodulation is performed on the converted signal, and the demodulated signal is decoded.

The I/Q demodulation may be performed by the I/Q demodulator. The decoding may be performed by the baseband unit. Having performed I/Q demodulation on the signal, the I/Q demodulator will send the demodulated signal to the baseband unit, where decoding may be performed.

The step 203 may further include detecting the signal sent by the BS. The detection may be performed as follows. A transmission mode and a decoding mode may be selected for the demodulated I/Q signal according to synchronization information of the signal sending BS side. The synchronization information of the BS side may include a pilot signal, a modulation mode, a downlink synchronization code, etc.

The signal may be detected by the protocol detecting device. In addition, the protocol detecting device will send the selected decoding mode to the baseband unit. The baseband unit may decode the signal using a data processing unit such as a RISC processor or a DSP.

A transmission mode may be selected for the demodulated I/Q signal as follows. When the synchronization information such as a GMSK modulation mode shows that the signal sent by the BS is a GSM signal, the I/Q demodulator may be automatically matched with a transmission mode of a DigRF interface protocol; the demodulated I/Q signal may then be transmitted to the baseband unit. When the synchronization information such as a downlink synchronization code shows that the signal sent by the BS is a TD-SCDMA signal, the I/Q demodulator may be automatically matched with a 10-bit parallel-port data transmission mode; the demodulated I/Q signal may then be transmitted to the baseband. When the synchronization information such as a downlink synchronization code shows that the signal sent by the BS is a TD-LTE signal, the I/Q demodulator may be automatically matched with a 12-bit parallel-port data transmission mode; the demodulated I/Q signal may then be transmitted to the baseband unit.

A decoding mode may be selected for the demodulated I/Q signal as follows. The signal may be decoded using a data processing unit (such as a RISC processor or a DSP) in the baseband unit corresponding to the mode of the signal.

Before the demodulated signal is sent to baseband, the protocol detecting device may send the detected transmission mode to the I/Q demodulator. The I/Q demodulator may send the signal to the baseband according to the transmission mode.

For example a signal in a GSM 1800 MHz band may be automatically matched with a transmission mode of a DigRF interface protocol; the demodulated I/Q signal may be transmitted to the baseband.

What described are merely embodiments of the disclosure and are not intended to limit the scope of the disclosure.

INDUSTRIAL APPLICABILITY

With a multi-mode receiver and receiving method thereof according to an embodiment herein, an antenna switch may be built inside the multi-mode receiver, such that a receiving circuit front end corresponding to a frequency band of a received signal may be selected; a protocol detecting device may be built inside the multi-mode receiver, such that modes of same-band signals may be detected; thereby a transmission mode for transmitting the demodulated I/Q signal and a decoding unit for decoding the I/Q signal transmitted to the baseband may be provided. Therefore, same-band signals in different modes may share one receiving circuit front end, reducing a number of RF chips used, lowering cost.

The invention claimed is:

1. A multi-mode receiver, comprising an antenna, an antenna switch, one or more receiving circuit front ends in parallel, a protocol detecting device, an In-phase/Quadrature I/Q demodulator, and a baseband unit, the antenna being connected to one end of the antenna switch, the other end of the antenna switch being connected to an input of the protocol detecting device, a first output of the protocol detecting device being connected to an input of the I/Q demodulator, a second output of the protocol detecting device being connected to an input of the baseband unit, the other end of the antenna switch further being connected to input of the one or more receiving circuit front ends, the input of the I/Q demodulator further being connected to output of the one or more receiving circuit front ends, wherein
the antenna is configured for: receiving a signal sent by a base station BS, and transferring the signal sent by the BS to the antenna switch, the signal sent by the BS being in a mode and in a frequency band;

the antenna switch is configured for: receiving the signal received by the antenna, forwarding the signal received by the antenna to a receiving circuit front end of the one or more receiving circuit front ends that corresponds to the frequency band of the signal received by the antenna, and sending the signal received by the antenna to the protocol detecting device;

each of the one or more receiving circuit front ends is configured for: receiving the signal received by the antenna forwarded by the antenna switch, performing frequency conversion on the signal received by the antenna, and sending the down-converted signal to the I/Q demodulator, the frequency conversion comprising filtering, amplification, down-conversion, Intermediate-Frequency IF filtering, and IF amplification;

the protocol detecting device is configured for: receiving and detecting the signal received by the antenna; determining, according to synchronization information of the signal-sending BS side, the mode of the signal received by the antenna; selecting, according to the determined mode of the signal received by the antenna, a transmission mode for transmitting a demodulated signal and a decoding mode for decoding the demodulated signal; informing the I/Q demodulator of the selected transmission mode; informing the baseband unit of the selected decoding mode;

the I/Q demodulator is configured for: receiving and demodulating the down-converted signal; sending the demodulated signal to the baseband unit according to the transmission mode selected by the protocol detecting device; and the baseband unit is configured for: decoding the demodulated signal in the decoding mode selected by the protocol detecting device.

2. The multi-mode receiver according to claim 1, wherein the one or more receiving circuit front ends comprise a first receiving circuit front end, a second receiving circuit front end, and a third receiving circuit front end, wherein the first receiving circuit front end is configured for: receiving a first signal in a first frequency band received by the antenna forwarded by the antenna switch, performing the frequency conversion on the first signal, sending the down-converted first signal to the I/Q demodulator;

the second receiving circuit front end is configured for: receiving a second signal in a second frequency band received by the antenna forwarded by the antenna switch, performing the frequency conversion on the second signal, sending the down-converted second signal to the I/Q demodulator;

the third receiving circuit front end is configured for: receiving a third signal in a third frequency band received by the antenna forwarded by the antenna switch, performing the frequency conversion on the third signal, sending the down-converted third signal to the I/Q demodulator.

3. The multi-mode receiver according to claim 2, wherein each of the first signal, the second signal, and the third signal comprises a group of same-band signals in different modes; the first frequency band, the second frequency band, and the third frequency band differ from each other.

4. A receiving method for a multi-mode receiver, the multi-mode receiver comprising an antenna, an antenna switch, one or more receiving circuit front ends in parallel, a protocol detecting device, an In-phase/Quadrature I/Q demodulator, and a baseband unit, the antenna being connected to one end of the antenna switch, the other end of the antenna switch being connected to an input of the protocol detecting device, a first output of the protocol detecting device being connected to an input of the I/Q demodulator, a second output of the protocol detecting device being connected to an input of the baseband unit, the other end of the antenna switch further being connected to input of the one or more receiving circuit front ends, the input of the I/Q demodulator further being connected to output of the one or more receiving circuit front ends, the method comprising:

receiving, by the antenna, a signal sent by a base station BS, and transferring the signal sent by the BS to the antenna switch, the signal sent by the BS being in a mode and in a frequency band;

forwarding, by the antenna switch, the signal received by the antenna to a receiving circuit front end of the one or more receiving circuit front ends that corresponds to the frequency band of the signal received by the antenna, and sending the signal received by the antenna to the protocol detecting device;

performing, by the receiving circuit front end corresponding to the frequency band of the signal received by the antenna, frequency conversion on the signal received by the antenna, and sending the down-converted signal to the I/Q demodulator, the frequency conversion comprising filtering, amplification, down-conversion, Intermediate-Frequency IF filtering, and IF amplification;

detecting, by the protocol detecting device, the signal received by the antenna; determining, according to synchronization information of the signal-sending BS side, the mode of the signal received by the antenna; selecting, according to the determined mode of the signal received by the antenna, a transmission mode for transmitting a demodulated signal and a decoding mode for decoding the demodulated signal; informing the I/Q demodulator of the selected transmission mode; informing the baseband unit of the selected decoding mode;

demodulating, by the I/Q demodulator, the down-converted signal; sending the demodulated signal to the baseband unit according to the transmission mode selected by the protocol detecting device;

decoding, by the baseband unit, the demodulated signal in the decoding mode selected by the protocol detecting device.

5. The method according to claim 4, wherein the selecting, according to the determined mode of the signal received by the antenna, a transmission mode for transmitting a demodulated signal and a decoding mode for decoding the demodulated signal comprises:

automatically matching a Global System of Mobile communication GSM signal with a transmission mode of a Digital Radio Frequency DigRF interface protocol; automatically matching a Time Division-Synchronous Code Division Multiple Access TD-SCDMA signal with a 10-bit parallel-port data transmission mode; and automatically matching a Time Division Long Term Evolution TD-LTE signal with a 12-bit parallel-port data transmission mode; and decoding each of the GSM signal, the TD-SCDMA signal, and the TD-LTE signal using a data processing unit corresponding to the each of the GSM signal, the TD-SCDMA signal, and the TD-LTE signal.

* * * * *